(12) United States Patent
Schiesser et al.

(10) Patent No.: US 8,746,437 B2
(45) Date of Patent: Jun. 10, 2014

(54) GAPPING SYSTEM FOR SORTATION RATE MAXIMIZATION

(75) Inventors: Ricardo N. Schiesser, La Verne, CA (US); Clyde Ko, Hsinchu (TW); Rhonda J. Verploegen, Sparta, MI (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 13/468,507

(22) Filed: May 10, 2012

(65) Prior Publication Data

US 2012/0261234 A1 Oct. 18, 2012

Related U.S. Application Data

(62) Division of application No. 12/460,168, filed on Jul. 14, 2009, now Pat. No. 8,201,681.

(60) Provisional application No. 61/080,512, filed on Jul. 14, 2008.

(51) Int. Cl.
*B65G 43/00* (2006.01)

(52) U.S. Cl.
USPC .............. 198/460.1; 198/461.1; 198/575; 198/577; 198/617

(58) Field of Classification Search
USPC ............... 198/460.1, 461.1, 575, 577
See application file for complete search history.

(56) References Cited

U.S. PATENT DOCUMENTS

| | | | | |
|---|---|---|---|---|
| 3,944,049 A * | 3/1976 | Graybill | .............. | 198/461.1 |
| 4,604,704 A * | 8/1986 | Eaves et al. | ............... | 700/230 |
| 4,921,092 A * | 5/1990 | Crawford et al. | ........... | 198/460.1 |
| 5,058,727 A * | 10/1991 | Jahns et al. | ............... | 198/460.1 |
| 5,141,097 A * | 8/1992 | Oiry et al. | ................ | 198/460.1 |
| 5,201,397 A * | 4/1993 | Isaacs | .............. | 198/395 |
| 5,285,887 A * | 2/1994 | Hall | .............. | 198/460.1 |
| 5,979,636 A * | 11/1999 | Vanacore et al. | .......... | 198/460.1 |
| 6,629,018 B2 * | 9/2003 | Mondie et al. | ............... | 700/228 |
| 6,629,593 B2 * | 10/2003 | Zeitler | .............. | 198/460.1 |
| 6,812,426 B1 * | 11/2004 | Kotowski et al. | ............. | 209/589 |
| 7,090,067 B2 * | 8/2006 | Schiesser et al. | ............. | 198/395 |
| 7,975,830 B2 * | 7/2011 | Bacher et al. | ............... | 198/461.2 |
| 8,042,677 B2 * | 10/2011 | Konig et al. | .............. | 198/460.1 |
| 8,060,243 B2 * | 11/2011 | Ogawa | .............. | 700/224 |
| 8,360,230 B2 * | 1/2013 | Rompe | .............. | 198/460.1 |
| 2011/0240439 A1 * | 10/2011 | Rompe | .............. | 198/341.01 |

* cited by examiner

*Primary Examiner* — Joseph Dillon, Jr.

(57) ABSTRACT

The invention provides a method which minimizes the gaps between packages to the minimum required by the sorter. The gapping required to allow scanning the identification label(s) will be done first, then another gap adjustment (to reduce gaps) is done immediately after scanning. The induction control system requires inputs from additional sensors which are necessary to obtain certain package dimensions. This information (dimensions of the packages) is used by the control algorithm to calculate or select from a table based on package geometry, the minimum (or optimum) gaps required for scanning and by the sorter.

9 Claims, 2 Drawing Sheets

GAPPING SYSTEM FOR SORTATION RATE MAXIMIZATION

This application is a divisional application of U.S. patent application Ser. No. 12/460,168, filed Jul. 14, 2009, now issued U.S. Pat. No. 8,201,681. This application claims priority of U.S. provisional application No. 61/080,512, filed Jul. 14, 2008.

FIELD OF THE INVENTION

This invention relates to material handling, namely conveying and sorting of parcels and similar objects.

BACKGROUND OF THE INVENTION

Parcel sorters are machines used in material handling to convey and direct packages to different destinations. Most sorters are limited in speed, therefore the maximum sortation rate (number of packages that a sorter can process per unit of time) for a given mix of package sizes is limited. Given this speed limitation, in order to maximize the rate of certain sorters, including sorters able to parallel process more than one incoming stream of packages, it is necessary to reduce the gaps between packages to the minimum. This is particularly true for sorters known as "sliding shoe" sorters and narrow-belt crossbelt sorters in which a semi-continuous stream of packages can be induced. One such sliding shoe sorter is described in Veit, et al. U.S. Pat. No. 6,866,136, the contents of which are incorporated by reference herein. A number of systems for controlling the gaps between articles being fed to induction systems for sorters are known, including Zeitler, U.S. Pat. No. 6,629,593, Doane, et al. U.S. Pat. No. 5,038,911.

An induction system is the name given to the equipment used to prepare the flow of packages that is fed into a sorter. This preparation sometimes includes singulating and aligning the incoming packages and then adjusting the gaps between the packages. Except for systems which dynamically track previously identified packages, part of the induction equipment consists of means of identification of the destination of each package. This can be done by the use of laser scanners or cameras able to read bar codes or other types of printed labels on each package. There are other available means of package identification like, for example, RFID tags, but this invention applies to systems that rely on line of sight to read labels or printed surfaces in order to identify packages by optical means (laser scanners or cameras), not by radio frequency. In some markets, like CEP (courier, express and parcel) for example, the package identification label(s) can be located anywhere on the surface of a package being conveyed, and not on a particular face as it is done in other applications. If all identification labels are located on the top (or bottom) of the packages being conveyed, scanning (reading destination labels by a laser scanner or camera) can be done from above or below only. The problem is to read the package identification label(s) which can be located on other surfaces of the packages (front face, back face and sides).

SUMMARY OF THE INVENTION

A method for induction of packages to a sorting machine, wherein each package has destination information on one surface thereof, includes an initial step of transporting a series of packages in spaced positions along an induction conveyor, which induction conveyor includes a series of conveyor segments disposed end to end each operable at different speeds. Dimensions including length and width of each package on the induction conveyor are determined for each package. Each package is associated in a computerized control with its dimensions. The control system maintains a data record of each package, its position in the series of packages moving on the induction conveyor, and the results of the destination scan referred to below.

The control system is used to determine spacing required between pairs of successive packages on the induction conveyor for entry into a scanning zone such that imaging devices such as cameras directed at a front surface of a package being scanned and at a rear surface of a package being scanned have a clear line of sight to destination information which may be present on either of such surfaces. Conveyor segments supporting the package being scanned and packages ahead of and behind it on the conveyor, are operated at variable speeds in order to obtain the required spacing.

The front and rear surfaces of the package being scanned are imaged with the imaging devices continuing to transport each package on the indiction conveyor after scanning is completed. Conveyor segments downstream from the scanning zone are operated to adjust spacing between successive packages to a spacing suited for induction to a sorting machine; and then a series of packages are inducted with spacing as determined by the preceding steps from the induction conveyor to the sorting machine, on which the spacing is preferably maintained if the sorter is of the type having a transport conveyor that receives a stream of parcels from the induction conveyor.

The invention further contemplates an induction system including components used in the preceding method wherein the control system is programmed to carry out the foregoing method. These and other aspects of the present invention are discussed further in the detailed description that follows. It is to be understood that terms used herein not otherwise defined should be given their meanings recognized in the material handing art, if applicable, not more general definitions found in dictionaries. A conveyor, for example, means a system for transporting a series of packages continuously along a moving conveyor surface such as a belt or a series of belt sections arranged end to end. A conveyor is not "anything that conveys".

BRIEF DESCRIPTION OF THE DRAWING

In the accompanying drawings, wherein like numerals denote like elements.

DETAILED DESCRIPTION

Figure 1:
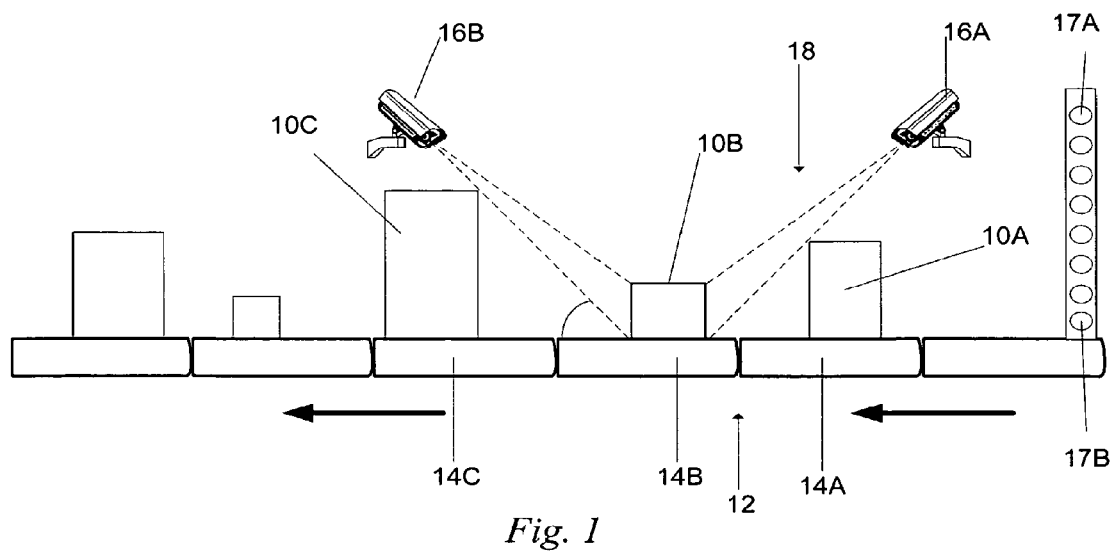
FIG. 1 is a side view of the scanning section of an induction system according to the invention.

A solution provided by the present invention is to open large enough gaps between adjacent packages to allow a direct line-of-sight from strategically-located laser scanners or cameras to read the labels anywhere on the surface of the packages at the required conveying speeds. Common practice is to control the induction system (usually containing a series of variable-speed conveyor belts) to generate an "optimum gap" that works in most cases. For example, the induction system control can be programmed to create a nominal gap of 15" between packages, with minimum gap variance. This usually produces gaps with a certain variance due to control limitations (number and response of sensors, control algorithm, processor speed, etc.) and mechanical factors (friction, behavior of packages during acceleration and deceleration, drive motor inertia, etc.) The result is a rather consistent gap (15"+/−2", for example). This method is widely used in the industry and it is also suitable for sortation equipment which requires relatively large gaps (package diverters, for example, which due to their design or geometry require gaps which normally exceed the minimum gap required for label scanning. This invention disclosure addresses two methods for gap adjustment wherein the application is dependent upon the maximum rate permitted by the sorting system.

According to a first aspect of the invention, a method is provided which minimizes the gap between each individual pair of packages to the minimum required to allow scanning the identification label(s) that might be in one or both adjacent faces of that pair of packages. When both packages are moving on a conveyor, "adjacent faces" refers to the leading end face of one package which is facing the trailing end face of the package ahead of it.

The invention provides a method which minimizes the gaps between packages to the minimum required by the sorter. The gapping required to allow scanning the identification label(s) will be done first, then another gap adjustment (to reduce gaps) is done immediately after scanning. The induction control system requires inputs from additional sensors which are necessary to obtain certain package dimensions. This information (dimensions of the packages) is used by the control algorithm to calculate or select from a table based on package geometry, the minimum (or optimum) gaps required for scanning and by the sorter. The algorithm will then generate commands to be sent to two gapping units usually consisting of series of variable-speed belt(s)) one unit prior to scanning the other between scanning and the sorter, both running under closed loop control.

The present invention uses a new control algorithm which reduces minimum gaps required to obtain a direct line-of-sight to the required portion of the faces of successive packages without being obstructed by adjacent packages. This method will be referred to as variable gap control. The induction control system will receive inputs from sensors, which are required to measure certain package dimensions. This information (dimensions of the packages) is used by the control system to calculate or select from a table, based on geometry, the minimum gap required by the scanning system (laser scanner or camera) to scan the surfaces of each pair of adjacent packages in search of labels, without obstruction, at a speed compatible with the equipment. Once the ideal gap is calculated or selected, other gap allowances might be added to determine the largest gap to be generated between those packages for scanning. The commands to be sent to the gapping unit, usually comprising a multitude of variable-speed conveyor belts are similar to those used in conventional gapping methods except that they will now generate variable gaps, i.e. gaps that are dependent on the sizes of the packages being processed. Given a series of packages moving in the same direction on a conveyor, the dimensions needed are the height of each package in the position it currently occupies on the conveyor the length of each package in the direction of travel on the conveyor. The packages are most often square or rectangular, but other shapes are possible.

Figure 2:
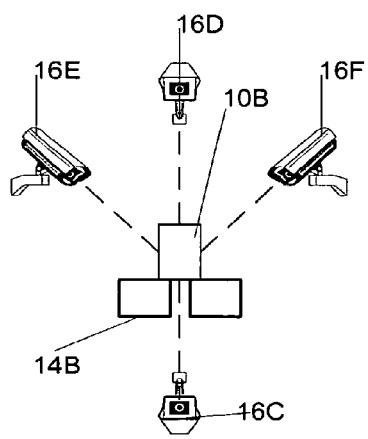
FIG. 2 is an end view of the scanning section shown in FIG. 1.

In the example shown in FIGS. 1 and 2, a series of packages 10 of different sizes are moving on a conveyor 12 such as a sliding shoe conveyor with adjacent segments 14 of limited length that can be driven at different speeds, or a belt conveyor with parallel belt segments which can be independently controlled by the gap control system, such as described in Mondie et al. U.S. Pat. No. 6,629,018, Sep. 30, 2003, the contents of which are incorporated by reference herein. Segments 14 have lengths such that it is possible to control the spacing between a series of packages 10 being transported that each segment 14 transports a single package 10 at a time either all the time, or for a time sufficient to execute variable gapping according to the invention.

A set of scanning cameras 16A-16F are positioned over a scanning section 18 of conveyor 12. Cameras 16A-F are positioned for reading label information on any of the six sides of each package 12. For this purpose each camera 16 should have a clear line of sight to the package surface it is aimed at or the portion thereof which contains the label or marking indicating destination information Imaging cameras 16 are in fixed positions and are generally incapable of movement that changes the cameras field of view.

The control system receives video signals from each camera 16 has previously received dimension information that it associates with each package. This could be provided, for example, by rows of photocells on opposite sides of conveyor 12 upstream from scanning section 18. A vertical series of photocells 17A measures the height of each package as it passes, and, a photocell 17B likewise projecting across the width of the conveyor 12 is used to measure the length of each parcel 10 as it passes using the speed of the belt and time used for passage of the leading and trailing edges to measure package length. Imaging cameras could also be used to measure the height and length of each package 10 as it passes on conveyor 12.

The control system is thus informed of the height and length of each package entering the scanning zone 18. The same means, such as photocell 17B, can be used to determine the gap between successive packages 10 as they enter scanning zone 18. In zone 18, camera 16A is positioned to image the rear surface of each package 10 as it passes, and camera 16B is positioned to image the front surface of each package 10 as it passes. A gap in conveyor 12 can be provided to that an upwardly directed camera 16C can image the bottom surface of the package 10. The gap can be configured as a space between adjacent segments 14 in the lateral direction as shown, or in the direction of travel of conveyor 12, spacing two segments 14 apart. Cameras 16 C, D E and F image the top, bottom, left side and right side surfaces respectively. The images are preferably made simultaneously as each package 10 reaches the proper position in zone 18.

During passage through zone 18, the control system operates conveyor segments 14 at speeds that maintain the desired spacing (gaps) between successive parcels 10A, 10B and 10C, where parcel 10B is the one currently in position for canning by the cameras 16. To allow the control system to keep all of the surfaces of parcel 10B visible when it is in position for scanning by all cameras 16, the control system calculates the lines of sight (dotted lines) needed to see the front and rear surfaces with cameras 16A, 16B. This makes use of the current gap between parcels 10A, 10B and 10B, 10C, and the height and length of each parcel, so that lines of sight can be projected as shown in FIG. 1. Conveyor segments 14A, 14B and 14C can be operated at different speeds to ensure clear lines of sight to the front and rear package surfaces exist when the parcel 10B is in position for scanning. These lines of sight may be calculated from the upper front corner of parcel 10A to the lower rear corner of parcel 10B, and from the upper rear corner of parcel 10C to the lower front corner of parcel 10B. As the conveyor 12 continues its travel, package 10C leaves the edge of the scanning zone, 10B replaces 10C, 10A replaces 10B and moves into position for scanning, and a new package 10 enters and becomes the new package 10A. In this manner all surfaces of each package 10 are scanned while maintaining the minimum required spacing for scanning between all packages 10 as they move through the scanning zone 18.

Regardless of the control method and algorithm used for gap adjustment (conventional or variable gaps), the gaps required for scanning can be, and usually are, larger than the minimum gaps required by the sorter. The ultimate minimum induction gaps are those dictated by the sorter itself.

Figure 3:
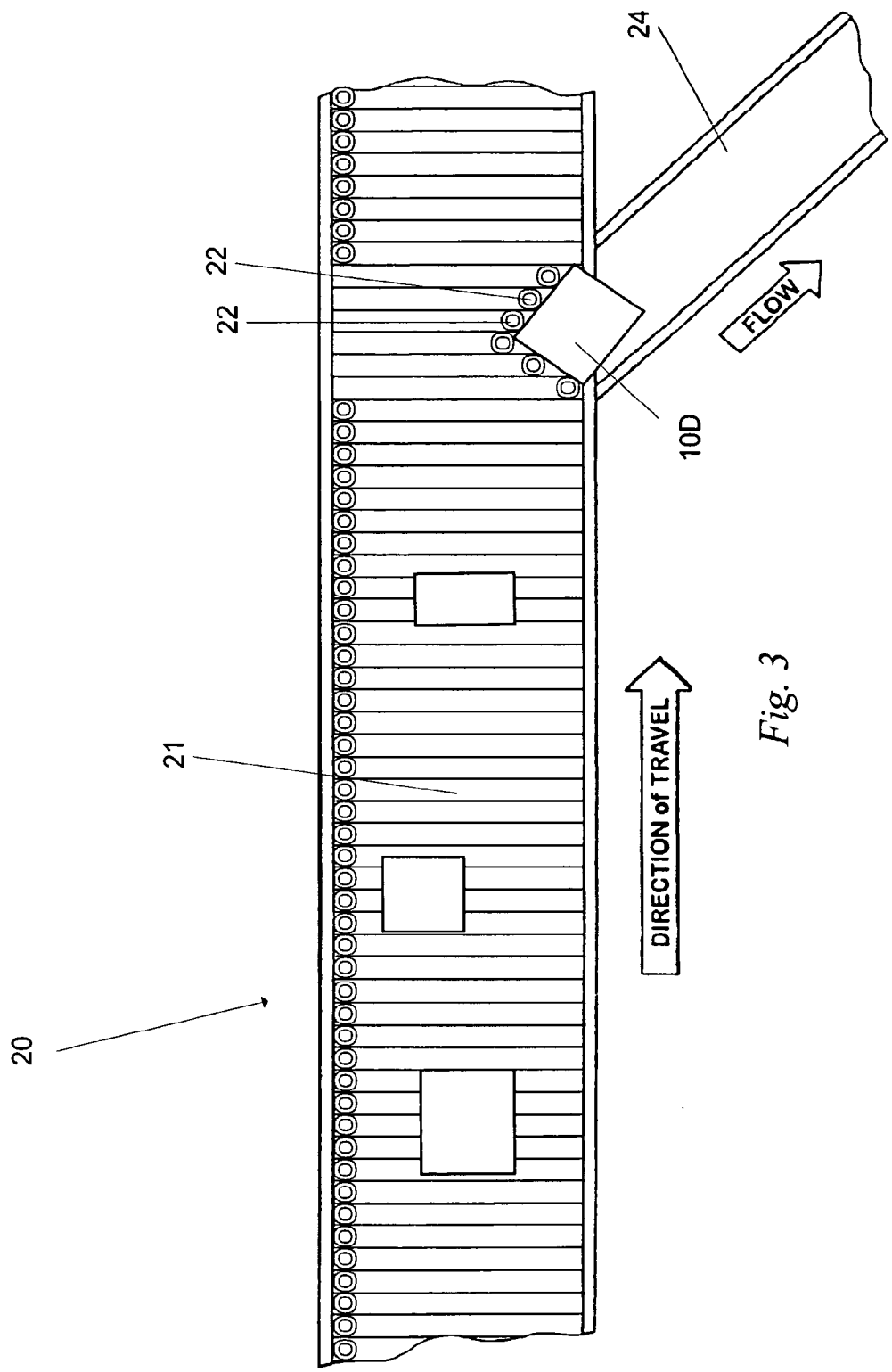
FIG. 3 is a top view of a sorting machine positioned to divert a package according to the invention.

In the case of many shoe sorters, one component of the sorter gap requirements is due to package rotation, as illustrated in FIG. 3. In FIG. 3, a package 10D has entered a sliding shoe sorter 20 after induction from conveyor 12 onto belt conveyor 21 of sorter 20. Package 10D is pushed by a series of sliding shoes 22 sideways toward a divert conveyor 24 which leads to a sortation bin or the like. Shoes 22 rotate package 10D into an angled orientation for diversion onto angled divert conveyor 24, e.g. a roller conveyor.

Potential collision between adjacent packages due to package rotation must be avoided during sorting. The control system knows the locations at which each package 10 will be diverted as part of the sort plan based on the destination information scanned in scanning zone 18. Package skewing or rotation caused by shoes 22 pushes a front corner of package 10D closer to the package 10E ahead of it. Another component that must be taken into account is the actual size and pitch of the sorter shoes 22. Small packages must be diverted by a calculated minimum number of shoes 22, and those shoes must not collide with adjacent packages 10 still on the sorter 20. The control system takes these factors into account when determining the gap spacing between packages 10.

In order to carry out gapping for the highest sortation rate possible, a method of the invention which utilizes gaps large enough just to comply to sorter gap requirements in systems where multiple side package label scanning is necessary. Due to the lines of sight needed as described above, the scanning step requires a greater spacing than the sorter requires. Therefore the method of the invention includes a step of reducing the size of the gaps after scanning to the minimum sorter-dictated gap values. Feeding a sorter such as a sliding shoe sorter at a given forward speed (feet/minute), the induction system must deliver packages to the sorter at that speed to avoid gap variation. Considering that the packages will have minimum gaps when fed into the sorter, during scanning (done upstream of the sorter) while with larger gaps, the forward speeds must be higher than that of the sorter. The induction system of the invention therefore adjusts the gaps for scanning at high speed, then slows down the packages while adjusting the gaps to the minimum gaps dictated by the sorter itself.

The method of the invention minimizes the gaps between packages to the minimum required by the sorter. The gapping required to allow scanning the identification label(s) is done first in zone 18 as described above, then another gap adjustment (to reduce gaps) will be done immediately after scanning by controlling the speed of the conveyor segments 14 immediately downstream from zone 18.

Although several embodiments of the present invention have been described in the foregoing detailed description and illustrated in the accompanying drawings, it will be understood by those skilled in the art that the invention is not limited to the embodiments disclosed but is capable of numerous rearrangements, substitutions and modifications without departing from the spirit of the invention. For example while the invention is intended for use with conventional paperboard packages, it could be applied to other types of containers or other items moving along a conveyor system for induction into a sorting system. Such modifications are within the scope of the invention as expressed in the appended claims.

The invention claimed is:

1. A system for spacing packages, the system comprising:
an induction conveyor configured to transport a series of packages, the induction conveyor including a series of conveyor segments each operable at different speeds, wherein each package in the series of packages has destination information on one surface;
a first imaging scanner positioned at a downstream end of a scanning zone along the induction conveyor;
a second imaging scanner positioned at an upstream end of the scanning zone;
a measurement system configured to measure a height and a length of each package in the series of packages to form measurement information associated with each package; and
a control system configured to:
determine a first spacing between a first package in the series of packages and a second package downstream from the first package on the induction conveyor based on the measurement information associated with the first and second packages such that, when the first package is present in a scanning zone of the induction conveyer, the first imaging scanner will have a line of sight to a downstream surface of the first package;
determine a second spacing between the first package and an upstream package upstream from the first package on the induction conveyor based on the measurement information such that, when the first package is present in a scanning zone of the induction conveyer, the second imaging scanner will have a line of sight to an upstream surface of the first package; and
control a speed of one or more conveyor segments in the series of conveyor segments to obtain the first spacing and the second spacing.

2. The system of claim 1, wherein the controller is further configured to determine the first spacing based on a height of the downstream package.

3. The system of claim 1, wherein the first imaging scanner is configured to scan the downstream surface of the first package and the second imaging scanner is configured to scan the upstream surface of the first package.

4. The system of claim 1, further comprising:
a sorting machine,
wherein the controller is further configured to control a speed of at least one conveyor segment downstream from the scanning zone to adjust spacing between successive packages to a spacing suited for induction to the sorting machine.

5. The system of claim 4, wherein the sorting machine is a sliding shoe sorting machine including a transport conveyor configured to receive the series of packages from the induction conveyor.

6. The system of claim 1, wherein the measurement system includes a vertical series of photocells positioned to measure the height of each package.

7. The system of claim 1, wherein the measurement system includes at least one photocell positioned to measure the length of each package.

8. The system of claim 1, wherein the measurement system is further configured to measure a gap between the first package and the upstream package.

9. The system of claim 1, further comprising an upwardly directed camera positioned to obtain an image of a bottom surface of the first package.

\* \* \* \* \*